(12) United States Patent
Stahl et al.

(10) Patent No.: US 7,005,655 B2
(45) Date of Patent: Feb. 28, 2006

(54) STORAGE PHOSPHOR PANEL FOR STORING IMAGE INFORMATION AND X-RAY CASSETTE

(75) Inventors: Werner Stahl, Heimstetten (DE); Olaf Klabunde, Hohenkirchen-Siegertsbrunn (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 326 days.

(21) Appl. No.: 10/309,719

(22) Filed: Dec. 4, 2002

(65) Prior Publication Data

US 2003/0128815 A1 Jul. 10, 2003

(30) Foreign Application Priority Data

Dec. 20, 2001 (EP) ................................ 01130409

(51) Int. Cl.
*G03B 42/02* (2006.01)
(52) U.S. Cl. .................. 250/484.4; 250/581; 250/589; 378/187; 271/268
(58) Field of Classification Search ............ 250/484.4, 250/581, 584, 589, 590; 378/187, 182, 188; 271/268

See application file for complete search history.

(56) References Cited

U.S. PATENT DOCUMENTS

| 5,265,865 | A | | 11/1993 | Agano et al. |
| 5,276,333 | A | * | 1/1994 | Robertson ................ 250/484.4 |
| 5,712,486 | A | * | 1/1998 | Soltani et al. ........... 250/484.4 |
| 6,437,359 | B1 | * | 8/2002 | Hall et al. ................... 250/589 |
| 6,534,779 | B1 | * | 3/2003 | Kohda et al. ............... 250/589 |
| 6,683,315 | B1 | * | 1/2004 | Wendlandt et al. ...... 250/484.4 |
| 6,818,905 | B1 | * | 11/2004 | Yonekawa ............... 250/484.4 |

FOREIGN PATENT DOCUMENTS

| DE | 198 59 747 C1 | 2/2000 |
| EP | 0 751 200 A1 | 1/1997 |
| EP | 0 851 290 A2 | 7/1998 |
| JP | 2000-235239 | 8/2000 |

* cited by examiner

*Primary Examiner*—Albert Gagliardi
(74) *Attorney, Agent, or Firm*—John A. Merecki; Robert A. Sabourin

(57) ABSTRACT

A storage phosphor panel for storing image information and an X-ray cassette with such a storage phosphor panel are proposed. The storage phosphor panel contains a carrier layer and a storage phosphor layer, which is applied on the carrier layer. The storage phosphor panel furthermore has a contour which is configured as an autonomous part relative to the carrier layer and is connected to the carrier layer.

14 Claims, 3 Drawing Sheets

STORAGE PHOSPHOR PANEL FOR STORING IMAGE INFORMATION AND X-RAY CASSETTE

FIELD OF THE INVENTION

The present invention relates to a storage phosphor panel for storing image information, this storage phosphor panel having a carrier layer and a storage phosphor layer, and to an X-ray cassette.

BACKGROUND OF THE INVENTION

For medical purposes, in particular, an image of an object, for example a patient, is generated by means of X-ray radiation, which image is stored as a latent image in a storage phosphor panel. In order to read out the X-ray radiation image stored in a storage phosphor layer of the storage phosphor panel, the storage phosphor layer is excited by means of a radiation source. On account of this excitation, the storage phosphor layer thereupon emits light having an intensity which is proportional to the quantity of X-ray radiation stored in the storage phosphor layer. The light emitted by the storage phosphor layer is received by a detection means and subsequently converted into electrical signals, so that the X-ray radiation image stored in the storage phosphor layer can subsequently be made visible. The X-ray radiation image can, for example, be displayed directly on a monitor or else be written to a photographic X-ray film.

The patent specification U.S. Pat. No. 5,265,865 discloses a device for reading out image information stored in a storage phosphor panel. This known device contains a radiation source and a detection means, by means of which a stored X-ray radiation image is read out. The storage phosphor panel is situated in a cassette. This cassette is inserted into a sheet feeding mechanism in order to withdraw the storage phosphor panel situated in the cassette from the cassette and insert it into a read-out device. To that end, the known read-out device can have various facilities which serve for transporting the storage phosphor panel out of the cassette. Such a possibility for withdrawing the storage phosphor panel from the cassette consists, for example, in the storage phosphor panel containing, within the storage phosphor layer, a hole into which moves a pin of a gripping arm in a direction lying perpendicular to the withdrawal direction. If the pin of the gripping arm is situated within the hole of the storage phosphor panel, then the gripping arm is moved in the withdrawal direction. As a result, the storage phosphor panel can be withdrawn from the cassette and inserted into the read-out device. Consequently, in accordance with U.S. Pat. No. 5,265,865, the gripping arm engages directly into a hole situated in the storage phosphor layer. During the withdrawal of the storage phosphor panel from the cassette, the storage phosphor panel is stressed very greatly precisely at the edges of the hole. This can lead to parts of the storage phosphor layer which are situated in the region of the hole breaking away under increasing stress through frequent withdrawal. As a result, the hole is increasingly enlarged. Furthermore, there is the risk that withdrawal of the storage phosphor panel from the cassette can actually no longer be ensured since precisely the storage phosphor that is greatly stressed in the pulling direction breaks away completely.

SUMMARY OF THE INVENTION

The present invention is therefore based on the object of enabling reliable movement of a storage phosphor panel.

In accordance with the present invention, the storage phosphor panel has a contour which is an autonomous shaped part and is fitted on the carrier layer. As a result, the contour can be configured independently of the carrier layer. The contour and carrier layer can in each case be coordinated with different requirements. The contour can be configured in such a way that it interacts optimally with a gripping arm which can be arranged in a device for reading the storage phosphor panel. To that end, the contour may advantageously have a cutout into which the gripping arm engages. As a result, reliable transportation of the storage phosphor panel can be ensured when the storage phosphor panel is withdrawn or inserted into a cassette. A situation where the storage phosphor panel is lost during transportation can be avoided.

The gripping arm can engage into the contour in a particularly simple manner if the contour is fitted in an edge region of the carrier layer. The gripping arm can then engage into the contour in a simple manner through an opening in the end side of the storage phosphor panel. The movement sequence of the gripping arm during engagement into the contour can therefore be configured particularly simply.

In a particularly advantageous refinement, the carrier layer and contour are made of different materials. Therefore, the carrier layer and contour can be coordinated particularly well with different requirements by way of the different material properties. The carrier layer can be coordinated in particular with diagnostic requirements. By contrast, the contour can be designed in particular for high resistance to wear. As a result, the storage phosphor panel according to the invention can be provided for a very large number of uses. The carrier layer can be thicker or thinner than the contour, independently of the contour and depending on the respective applications. The contour can be coordinated, independently of the carrier layer, with the gripping arm in terms of material and/or shape. The contour is made, in particular, of hardened metal, thereby providing particularly high resistance to wear. As a result, a close tolerance of the dimensions of the contour can furthermore be ensured even after very frequent use—and thus a high degree of loading on the contour.

In a further advantageous refinement of the invention, no storage phosphor layer is applied in a region of the carrier layer which, in particular, runs along an end side of the storage phosphor panel. The contour is then arranged in that region. As a result, a storage phosphor layer is not even applied in a region which cannot be used for storing image information. The storage phosphor layer can therefore remain limited to that region which can also actually be utilized for storing image information.

In order to ensure a high-strength and precise connection between contour and carrier layer, the contour is advantageously riveted to the carrier layer. As an alternative or in addition, the contour may be adhesively bonded to the carrier layer. To that end, a high-strength adhesive should be used.

In a further advantageous refinement, the contour is formed by an L-shaped cutout. In this case, the L-shaped cutout is arranged in such a way that an opening is produced toward the edge of the storage phosphor panel. For the sake of simplicity, the gripping arm can move into the contour through the opening. The gripping arm can fixedly grip the contour by means of a simple sideward movement after moving into the contour.

The storage phosphor panel advantageously contains a plurality of contours. This enables uniform transportation of the storage phosphor panel. This applies in particular when the plurality of contours are arranged on the same end side of the storage phosphor panel. Precise and stable transportation is ensured primarily when the contours are arranged near to a corner region of the end side with respect to another end side.

In a particularly advantageous refinement of the invention, the storage phosphor panel contains a further contour which may serve for fixing and/or positioning the storage phosphor panel in a cassette. This further contour makes it possible to fix the storage phosphor panel in the cassette at a defined location, so that it is possible, in a simple manner, for the gripping arm of the device for reading the storage phosphor panel to engage into the contour for gripping the storage phosphor panel. In this connection, fixing can in this case mean both simple holding of the storage phosphor panel in the cassette, so that the storage phosphor panel cannot slip out of the cassette, and fixed clamping of the storage phosphor panel in the cassette.

The further contour may advantageously be configured as an autonomous part relative to the carrier layer. This makes it possible for the further contour also to be coordinated with the respective requirements with regard to form and material independently of the carrier layer. The further contour is intended, in particular, to prevent the storage phosphor panel from slipping in the cassette. This reduces wear of the storage phosphor panel. Deformation of the storage phosphor panel, in particular in the event of the cassette dropping onto the floor, can largely be avoided by means of a high-strength connection of the further contour to the carrier layer and a fixed fixing.

The further contour may, for the sake of simplicity, be realized by a cutout in the carrier layer. This may be e.g. a rectangular cutout in the edge region. It is particularly advantageous, however, if the contour is fitted in an inner region of the carrier layer. This provides particularly good fixing.

The invention and its advantages are described below using exemplary embodiments.

BRIEF DESCRIPTION OF THE DRAWINGS

In the figures.

Hereinafter, identical reference symbols are used throughout for identical and identically acting elements.

DETAILED DESCRIPTION OF THE INVENTION

Figure 1:
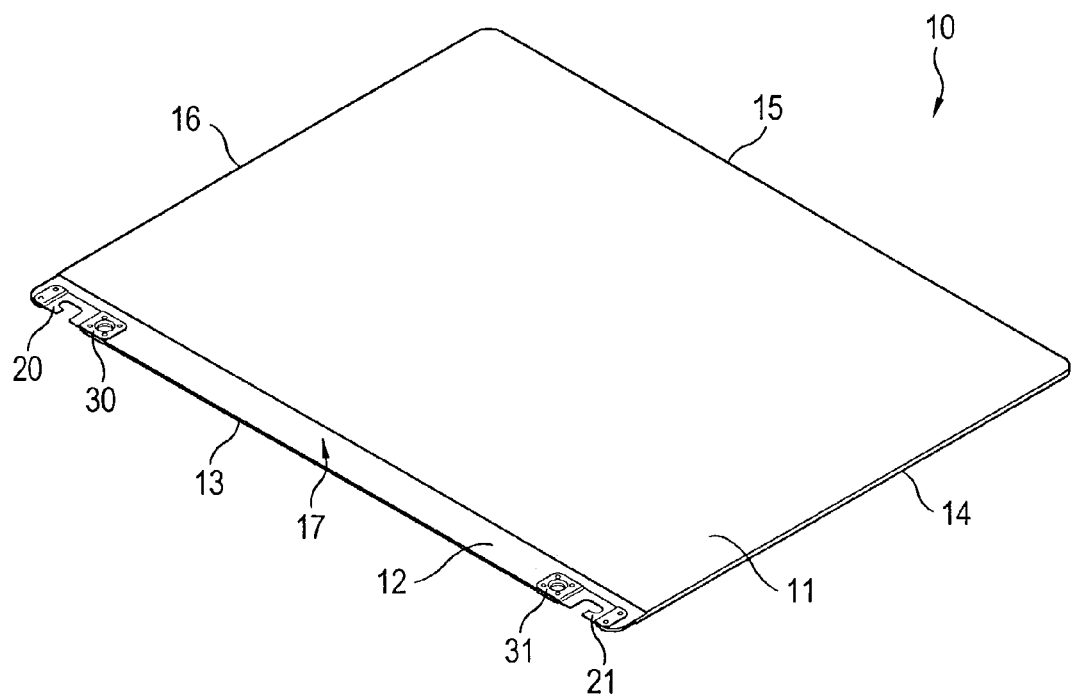
FIG. 1 shows an exemplary embodiment of a storage phosphor panel according to the invention with contours for gripping and fixing.

FIG. 1 shows a storage phosphor panel 10. The storage phosphor panel 10 contains a storage phosphor layer 11, which is applied on a carrier layer 12. The storage phosphor panel 10 serves for storing X-ray information which is stored in the storage phosphor layer 11 through irradiation with X-ray radiation.

The storage phosphor layer 11 may have, in particular, a special crystallite, acicular structure, as is known for example from the patent specification DE 198 59 747 C1. This special storage phosphor layer has a multiplicity of "needles" which can serve for carrying both excitation radiation, which is used to excite the storage phosphor layer, and emission radiation, which is emitted by the storage phosphor layer on account of the excitation. Crystalline "needles" are grown for such a storage phosphor layer. Such a needle-type storage phosphor layer is constructed from alkali metal halides, such as e.g. cesium bromide. These structured alkali metal halides can be doped with suitable activators, such as e.g. gallium, thallium, europium, etc. The individual needles are usually separated from one another by a small air gap. Excitation radiation which is incident into such a needle at a specific angle is forwarded largely without scattering until it meets an information center, in which X-ray information is stored, in the crystal lattice of the "needle". The emission radiation produced by the excitation of the information center is forwarded in the corresponding "needle" and passed out from the latter, so that it can be detected by a detection means.

Such an acicular storage phosphor layer is known in particular from the European patent application EP 0 751 200 A1. The use of this special storage phosphor layer reduces scattering of the excitation radiation and of the emission radiation within the storage phosphor layer.

In the exemplary embodiment in accordance with FIG. 1, the storage phosphor layer 11 is not applied to the entire carrier layer 12. No storage phosphor layer is applied to the carrier layer 12 in a region 17 of the carrier layer 12. The storage phosphor panel 10 has an approximately rectangular form. It has two long end sides 13 and 15 lying parallel and also two short end sides 14 and 16 lying parallel. The short end sides 14 and 16 run perpendicular to the long end sides 13 and 15. The storage phosphor panel 10 may, in particular, have a format with the dimensions of 14"×17". The region 17 in which no storage phosphor layer 11 is applied to the carrier layer 12 runs approximately along the long end side 13 of the storage phosphor panel 10. On the outer left-hand side of the end side 13, toward the end side 16, a first contour 20 for gripping the storage phosphor panel 10 is fitted on the carrier layer 12 within the region 17. A second contour 30 is situated beside it within the region 17. The second contour 30 serves for fixing the storage phosphor panel 10 in an X-ray cassette. In the right-hand edge region, toward the end side 14 of the storage phosphor panel 10, a third contour 21 for gripping the storage phosphor panel 10 is fitted in the carrier layer in the region 17. Situated directly adjacent to the third contour 21 there is a fourth contour 31 in the carrier layer 12. This fourth contour 31 likewise serves for fixing the storage phosphor panel 10 in the X-ray cassette. The two contours 30 and 31 for fixing the storage phosphor panel 10 are in this case advantageously fitted along the same end side 13. They are situated in the region 17 in which there is no storage phosphor layer 11. However, it is also possible to fit the contours for fixing the storage phosphor panel 10 on one or more of the other end sides 14, 15, 16.

Figure 2:
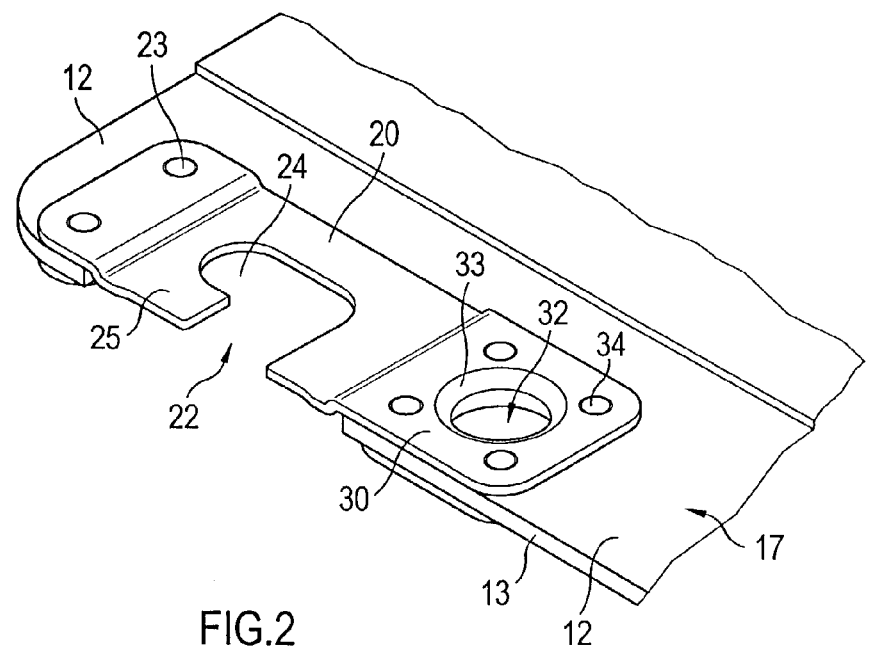
FIG. 2 shows a more detailed illustration of the contours for gripping and fixing which are shown in FIG. 1.

FIG. 2 shows the more detailed illustration of the first contour 20 and the second contour 30. The first contour 20 and the second contour 30 are in this case configured as a one-part shaped part. However, it is equally possible to configure the two contours 20 and 30 independently of one another as in each case autonomous shaped parts. The two contours 20 and 30 are in this case made of hardened metal. The latter is particularly resistant to wear. However, it is also possible to produce the contours from plastic, in particular a glass-fiber-reinforced plastic. The two contours 20 and 30 are connected to the carrier layer 12 mechanically with high strength and precisely. This is achieved here by means of rivets, for the sake of simplicity. By way of example, FIG. 2 illustrates a rivet 23 on the left-hand side of the contour 20 and a rivet 34 on the right-hand side of the contour 30. In addition to riveting the contours 20 and 30 to the carrier layer 12, the two contours 20 and 30 can be adhesively bonded to the carrier layer 12. It is also possible to weld the contours to the carrier layer if this is permitted by the material chosen for the contours and the carrier layer. The carrier layer 12 is in this case produced from a plastic material. This plastic material is specially coordinated with diagnostic requirements which are made of the storage phosphor panel 10.

The first contour 20 is formed by means of a cutout 22 having an opening in an edge region of the carrier layer 12, i.e. in this case toward the end side 13. The cutout 22 is in this case configured in an L-shaped manner, like a type of hook. In other words, in this case it has a bulge 24 on the left-hand side of the cutout 22, toward the end side 16. As a result, a web 25 is produced in the contour 20, which web is used for gripping by the gripping arm. The gripping arm can move into the cutout 22 through the opening in the cutout 22 which is present toward the end side 13. It is then moved toward the left into the bulge 24. During the withdrawal of the storage phosphor panel 10 from the X-ray cassette, it encounters a resistance at the web 25, so that the withdrawal of the storage phosphor panel 10 can be effected.

The second contour 30 is formed by means of an opening 32, which in this case has a circular form. The second contour 30 has an upper edge 33, which is flattened in frustoconical fashion. In addition or as an alternative the upper edge 33 may be round. The second contour 30 is fitted on the carrier layer 12 in an inner region of the region 17. Toward the end side 13, therefore, no opening is produced in the region of the second contour 30. By virtue of the circular configuration of the opening 32 and the frustoconical or rounded configuration of the upper edge 33, it is possible, in a simple manner, to fix the storage phosphor panel 10 in the X-ray cassette. By way of example, a bolt with a round cross section which is situated in the X-ray cassette can move into the opening 32 from above and press the storage phosphor panel 10 in the region of the contour 30 against an area situated below the contour 30. Consequently, a force which is applied to the X-ray cassette and may arise for example in the event of the X-ray cassette dropping onto the floor is transmitted to the storage phosphor panel 10 only in the region of the contours 30 and 31 (the latter is not specifically illustrated in FIG. 2). In such a case, damage to the storage phosphor panel can be prevented on account of the high-strength connection of the contours 30 and 31 to the carrier layer 12. This applies particularly when the sizes of the X-ray cassette and of the storage phosphor panel 10 and also the positions of the contours for fixing are chosen such that the edges of the storage phosphor panel 10 do not touch the side walls of the X-ray cassette. Consequently, e.g. when the X-ray cassette experiences a fall, no force can be transmitted to the storage phosphor panel 10 via the side walls of the X-ray cassette. On account of the frustoconical or rounded configuration of the upper edge 33 of the second contour 30, the bolt provided in the X-ray cassette for fixing the storage phosphor panel 10 can move into the opening 32 more easily. The upper edge 33 of frustoconical or rounded configuration serves as a type of guide which guides the bolt into the opening 32. The round configuration of the opening 32 provides very precise assignment of the storage phosphor panel 10 to the bolt. A play occurring in the configuration of the bolt and of the second contour 30 turns out to be the same in all directions of the circular opening 32. In this respect, a circular configuration of the second contour 30 is advantageous compared with other forms of the contours for fixing the storage phosphor panel 10. Generally, however, other forms of contours for fixing are also possible.

Figure 3:
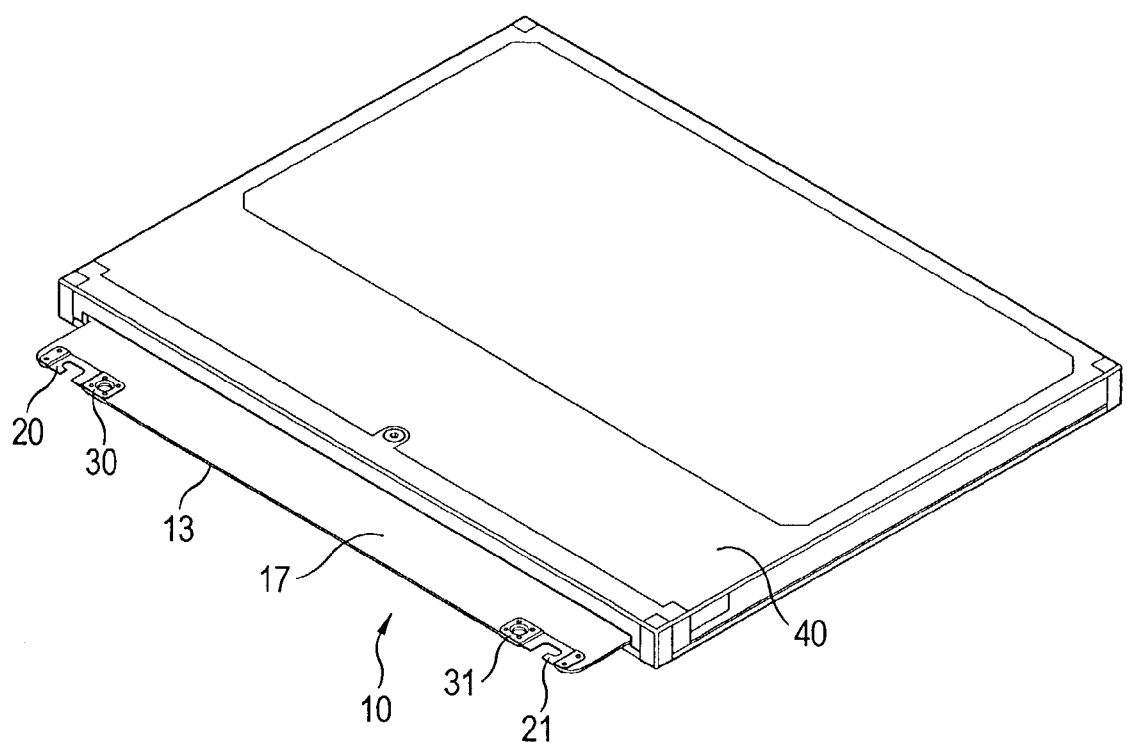
FIG. 3 shows an exemplary embodiment of an X-ray cassette with a storage phosphor panel according to the invention.

FIG. 3 shows an exemplary embodiment of an X-ray cassette 40 into which the storage phosphor panel 10 is introduced. In the illustration in accordance with FIG. 3, the end side 13 and, situated behind it, the region 17 with the contours 20, 30 and 21, 31 project from an opening of the X-ray cassette 40.

Figure 4:
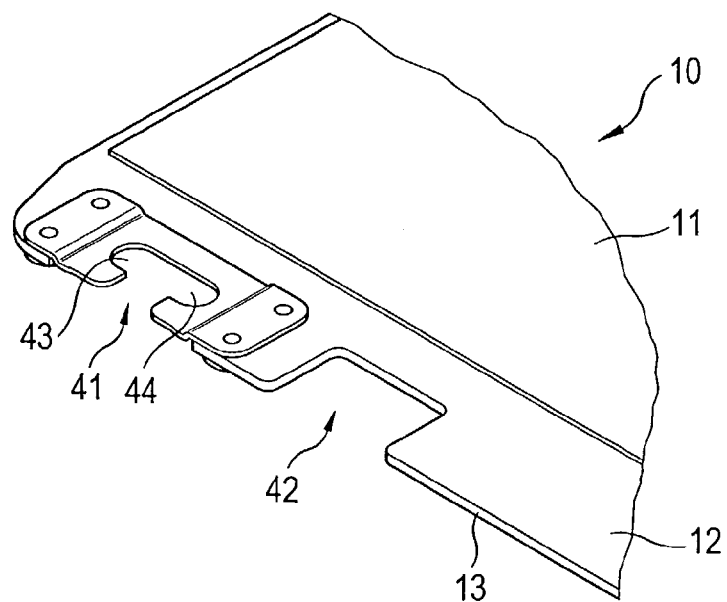
FIG. 4 shows an exemplary embodiment of the contours for gripping and fixing.

FIG. 4 shows a further exemplary embodiment of a configuration of the contours for gripping the storage phosphor panel 10 and for fixing the storage phosphor panel 10 in an X-ray cassette. FIG. 4 shows a fifth contour 41, which may serve for gripping the storage phosphor panel 10 by means of a gripping arm situated in a direction for reading the storage phosphor panel 10. In addition to a first bulge 43 on the left-hand side of the contour 41, as is already illustrated at least in a similar manner in FIG. 2, the contour 41 in this case has a second bulge 44 on its right-hand side. The two bulges 43 and 44 are advantageously identical. The storage phosphor panel 10 can thus be produced and mounted more easily. This is because when the contour 41 is applied to the carrier layer 12, it is not necessary to take account of the orientation of the bulge of the contour 41 since the contour 41 is configured symmetrically. In this respect, the second bulge 44 could also be arranged on the left-hand side of the contour 41 and the first bulge 43 on the right-hand side of the contour 41. Both bulges 43 and 44 are identical. In this respect, the contour 41 is formed by means of a T-shaped or anchor-shaped cutout.

FIG. 4 furthermore shows a sixth contour 42, which may serve for fixing the storage phosphor panel 10 in an X-ray cassette. The sixth contour 42 is in this case formed by a cutout made in the carrier layer 12. The contour 42 in this case has a rectangular configuration and is open toward the end side 13. In this respect, in this exemplary embodiment in accordance with FIG. 4, an autonomous shaped part is not necessary as contour for fixing the storage phosphor panel 10. For example, a rectangular bolt moving down from the inner side of the X-ray cassette into the cutout 42 can prevent the storage phosphor panel 10 from falling out of an opened X-ray cassette. For fixing the storage phosphor panel 10 by means of the contour 42, the storage phosphor panel 10 can be pressed against the rear wall of the X-ray cassette in particular by a bolt engaging into the contour 42. As a result of such fixing and positioning of the storage phosphor panel 10 in the X-ray cassette, it is easily possible for a gripping arm to move into the contour 41 in order to grip the storage phosphor panel 10 for withdrawal from the X-ray cassette.

Figure 5:
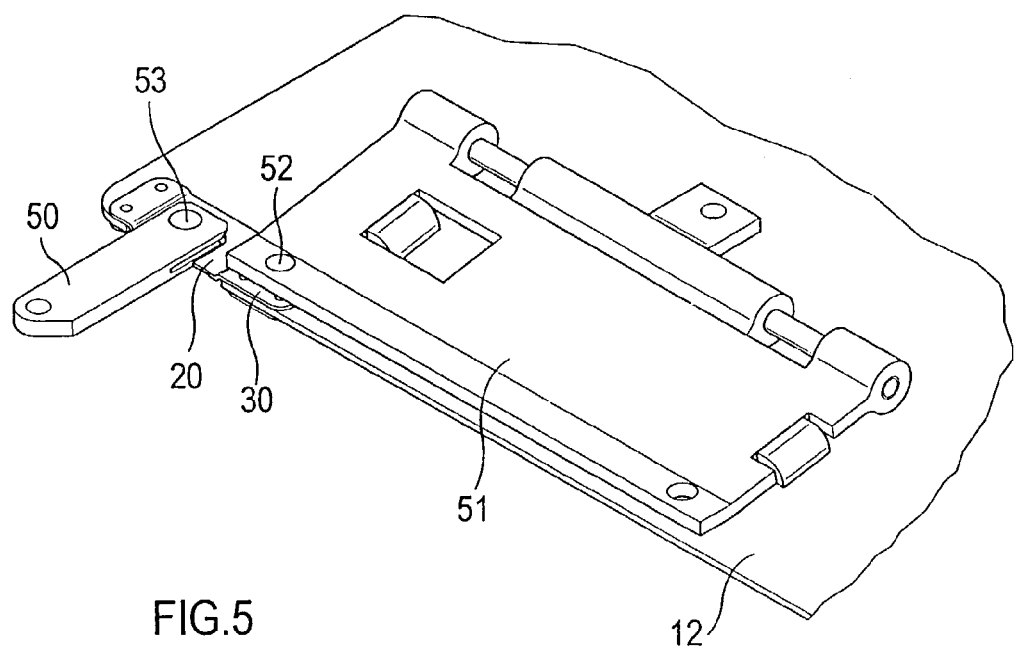
FIG. 5 shows an example of gripping and fixing of the storage phosphor panel according to the invention, and FIGS. 6A, B show a further exemplary embodiment of contours for fixing and fixing bolts of conical configurations which can be used for fixing.

FIG. 5 shows an example of a gripping arm 50 which has engaged into the first contour 20. A bolt with, in particular, a round cross section which is situated in the gripping arm 50 can easily move into the contour 20. FIG. 5 illustrates the upper side 53 of a bolt which projects downward into the contour 20, and which is moved into the first contour 20 by means of the gripper and is used for withdrawing and inserting the storage phosphor panel 10 into the X-ray cassette. FIG. 5 furthermore shows a control flap 51 which can be fixed within the X-ray cassette. At the left-hand side, directly above the opening 32, a further bolt 52 is fitted in the control flap 51, which bolt serves for fixing the storage phosphor panel 10 in the X-ray cassette. The control flap 51 is folded down by a mechanism, so that the bolt 52 moves into the second contour 30. The storage phosphor panel 10 is thereby fixed. A further control flap (not illustrated) serves for the fixing of the storage phosphor panel 10 by means of the fourth contour 31.

Figure 6A:
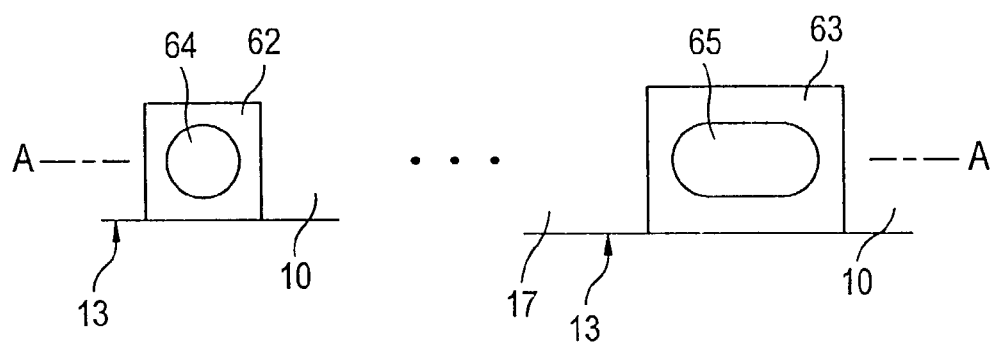

FIG. 6A shows a further exemplary embodiment for the configuration of the fixing contours. FIG. 6A illustrates a detail from the region 17 of the storage phosphor panel 10. On the left-hand side, a contour 62 for fixing the storage phosphor panel 10 is fitted on the storage phosphor panel 10 and, on the right-hand side, a further contour 63 for fixing the storage phosphor panel 10 is fitted on the storage phosphor panel 10. In this case, the two contours 62 and 63 are arranged along the same end side 13 of the storage phosphor panel 10. The contour 62 is formed by means of a round opening 64 in its interior. The contour 63 is formed by means of an opening 65 in its interior which has a form of an elongated hole.

Figure 6B:
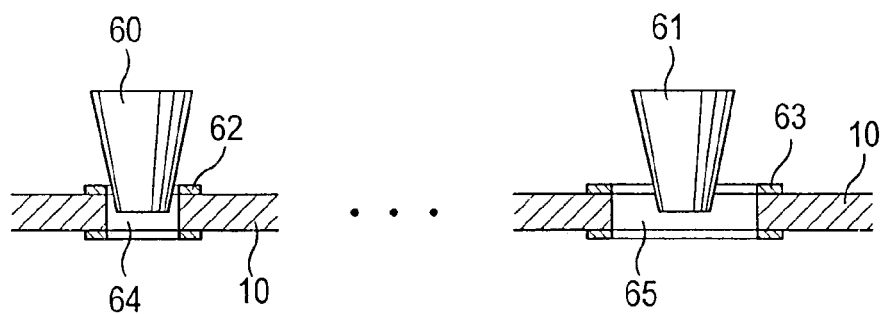

FIG. 6B shows a sectional illustration along the section line AA of FIG. 6A. A first bolt 60 and a second bolt 61 are additionally illustrated, which serve for fixing the storage phosphor panel 10 in the X-ray cassette and are fixed to control flaps such as, for example, the control flap 51 from FIG. 5. The first bolt 60 is positioned above the opening 64 and the second bolt 61 is positioned above the opening 65. The two bolts 60 and 61 are of conical configuration and can be moved in the vertical direction. As a result, when the bolts 60 and 61 are moved down, it is possible to achieve a play-free positively locking joint with the two contours 62 and 63. Redundancy of the arrangement is avoided on account of the elongated hole configuration of the opening 65. The moved-down bolt 61 does not achieve a positively locking point with the contour 63 in the propagation direction of the end side 13, but rather only in the direction perpendicular to the propagation direction of the end side 13. The tolerances of the contours 62 and 63 and of the bolts 60 and 61 advantageously need not be narrow.

We claim:

1. A storage phosphor panel for storing image information, comprising:
    a carrier layer;
    a storage phosphor layer, which is applied on the carrier layer; and
    a contour which is formed to include one or more cutouts, wherein said contour is an autonomous part attached to the carrier layer and
    wherein said one or more cutouts each comprises a configuration which is independent of the carrier layer, and an opening toward a first side of the carrier layer so that a gripping arm can move into the cutout through the opening.

2. The storage phosphor panel as claimed in claim 1, wherein the contour is connected to the carrier layer in an edge region thereof.

3. The storage phosphor panel as claimed in claim 1, wherein the carrier layer is made of a first material and the contour is made of a second material.

4. The storage phosphor panel as claimed in claim 1, wherein the carrier layer has a region, in which no storage phosphor layer is applied, and the contour is arranged in said region.

5. The storage phosphor panel as claimed in claim 4, further comprising two short end sides arranged parallel to one another and two long end sides arranged parallel to one another and the contour is arranged in an end side, which is situated in the region of the carrier layer in which no storage phosphor layer is applied.

6. The storage phosphor panel as claimed in claim 3, wherein the second material of the contour is a metal material.

7. The storage phosphor panel as claimed in claim 1, wherein the contour is riveted to the carrier layer.

8. The storage phosphor panel as claimed in claim 1, wherein the contour is adhesively bonded to the carrier layer.

9. The storage phosphor panel as claimed in claim 1, wherein said one or more cutouts includes an L-shaped cutout.

10. The storage phosphor panel as claimed in claim 1, wherein one of the cutouts is capable of fixing the storage phosphor panel in a cassette.

11. An X-ray cassette with a storage phosphor panel as claimed in claim 1.

12. The storage phosphor panel of claim 1 wherein said cutout farther comprises a bulge toward a second side of the carrier layer so that a web is obtained that can be used for gripping the storage phosphor panel by the gripping arm.

13. A storage phosphor panel for storing image information, the panel comprising:
    a carrier layer having a first section and a second section;
    a storage phosphor layer which is applied to only the first section of the carrier layer; and
    a contour defined as an autonomous part comprising one or more cutout sections each having a shape which is different than a shape of the carrier layer, said contour fastened to the second section of the carrier layer, wherein at least one of said cutout sections further comprises an opening toward a first side of the carrier layer so that a gripping arm can move into the at least one cutout section through the opening.

14. The storage phosphor panel of claim 13 wherein said at least one cutout section further comprises a bulge toward a second side of the carrier layer so that a web is obtained that can be used for gripping the storage phosphor panel by the gripping arm.

* * * * *